United States Patent [19]

Maier-Laxhuber et al.

[11] Patent Number: 4,674,563
[45] Date of Patent: Jun. 23, 1987

[54] ZEOLITE BLANKS WITH A HIGH HEAT CONDUCTIVITY AND PROCESS FOR MAKING THE SAME

[76] Inventors: Peter Maier-Laxhuber, Saumweberstrasse 14, D-8000 Munchen 60; Fritz Kaubek, Gasparistrasse 5 A, D-8000 Munchen 71, both of Fed. Rep. of Germany

[21] Appl. No.: 686,738

[22] Filed: Dec. 27, 1984

[30] Foreign Application Priority Data

Dec. 30, 1983 [DE] Fed. Rep. of Germany ....... 3347700

[51] Int. Cl.$^4$ .................... F28D 21/00; F17C 11/00
[52] U.S. Cl. ............................. 165/104.12; 55/269; 62/48
[58] Field of Search ............... 165/104.12; 55/269; 62/48

[56] References Cited

U.S. PATENT DOCUMENTS 4,270,360 6/1981 Nakane et al. ..................... 62/48
4,393,924 7/1983 Asami et al. .................. 165/104.12

FOREIGN PATENT DOCUMENTS

| 82899 | 6/1980 | Japan | 62/48 |
| 126199 | 9/1980 | Japan | 62/48 |
| 37486 | 3/1983 | Japan | 165/104.12 |
| 2088038 | 6/1982 | United Kingdom | 165/104.12 |

Primary Examiner—Albert W. Davis, Jr.
Attorney, Agent, or Firm—Hoffmann, Dilworth Barrese & Baron

[57] ABSTRACT

Blanks are provided from zeolite (1) which adsorb and desorb adsorbed substances and are provided with metal textures (3). The stability and the low heat conductivity of the blanks are increased by the metal textures (3). The metal texture is permanently connected with heat exchanger surfaces in a manner to provide good heat conductivity by means of known connecting techniques. The blanks contain separate flow conduits (4) for the adsorbed substances. The binder components in the zeolite filling are lesser in the inside of the blanks than in the outer areas.

11 Claims, 2 Drawing Figures

ZEOLITE BLANKS WITH A HIGH HEAT CONDUCTIVITY AND PROCESS FOR MAKING THE SAME

BACKGROUND OF THE INVENTION

The invention relates to blanks made from zeolite which adsorb and desorb an adsorbed substance and a process for making the same.

Zeolite crystals adsorb liquid and gaseous adsorbed substances under heat development. The released reaction heat must be dissipated from the zeolite material during the adsorption and must again be fed thereto during the desorption (separation of both substances). The reaction kinetic of the adsorption and desorption process is limited by a low heat conductivity of zeolite mass and by high pressure drops of the adsorbed substance which either flows thereto or therefrom.

The diameter of synthetic zeolite crystals is limited to a few micrometer. Powder fillings are not suitable for technical absorbing processes, since the fine zeolite crystals are subjected to turbulence and are carried out from the reaction spaces by the flow of the adsorbed substances. A further processing of the powderlike zeolite products in specific but expensive granulating processes by adding of binders in granulate, for example, small balls or cylinder permits the use of zeolite in drying processes. In these processes moist gases flow through the granulate fillers and emit the moisture to the granulate fillers. In this manner the dry gases absorb the generated reaction heat and cool the granulate. Hot and dry gases are fed in the subsequent process step for desorption of the granulate fillers. They transmit the reaction heat to the granulate and absorb the released moisture. In these so-called open processes the gases flow around each granulate body. The total surface of the granulate body is available for the heat exchange.

Zeolite granulates for the adsorption of steam in adsorption heat pumps and air conditioners are suggested in a plurality of patent applications. There the zeolite crystals adsorb steam in a closed process. Gas flows which could transmit the reaction heat are not available. The heat must be fed and dissipated from the outside by specific heat exchangers. The heat can only be transmitted via the contact faces of the granulate fillers. Therefore, the heat transmission is not dependent on the granulate surface but from the number of contact locations of the granulates among each other and with respect to the heat exchanger. Hence, the heat conductivity is therefore lower with fillers than with homogenic substances. The flow resistance is higher than in comparable flow conduits with smooth surfaces.

The DE No. 3 207 656 A1 suggests zeolite blanks which are adapted to the heat exchanger surfaces and which are provided with flow conduits that are most favorably designed for the adsorbed substance. After only a few desorption cycles the zeolite blanks detach from the heat exchanger surfaces. Thin slots are created which limit the heat transfer even more severely than with granulate fillers. Severely fluctuating temperature and load gradients generate cracks and slots within the blanks which additionally lower the heat conductivity. Broken-off zeolite parts block the flow conduits and prevent the access of the adsorbed substance to the zeolite.

SUMMARY OF THE INVENTION

It is therefore an object of the invention to increase the inner heat conductivity and the heat transfer to an adjacent heat exchanger in blanks made of zeolite and to assure it even under severely fluctuating temperature and load conditions. Simultaneously, the flow resistance for the given adsorbed substances is to be reduced to a minimum.

The object of the invention is solved in that the zeolite mass is imbedded into a fine meshed metal texture. The metal texture prevents a bursting and a breaking down of the zeolite blanks and simultaneously increases the heat conductivity. The low heat conductivity of the zeolite substance is considerably improved by the good heat conductivity of the metal structures. Particularly high adsorption speed can be obtained by a dense metal texture made from gold, silver, copper, aluminum, etc., and by a flat method of construction of the blanks.

In order to assure an unobstructed access for the adsorbed substances to the zeolite crystals, certain areas within the blank are not filled with zeolite mass. It is particularly advantageous when the outer zones of the metal texture are not covered with zeolite. Thus, a breaking off of small zeolite pieces and a blocking of the flow conduits can be effectively prevented.

Particularly fine meshed metal textures retain zeolite powder which is not solidified with a binder or only solidified to a lesser degree. Low amounts of binder components are advantageous for high heat conditions. In one form the binder content is lower in the inner area of the blank than in the edge zones. The outer areas which are more exposed to erosion will receive a higher portion of binder than the less stressed inner areas.

Fine meshed metal structures, like steel wool, metal textures, metal shavings and metal fleeces are suitable as metal textures. Particularly advantageous are metallic filter materials, like RETIMET ® or BEKIPOR ®. These commercial products have very good heat conductivity and retaining characteristics due to the dense interlacing structure of these products.

It is contemplated that a breaking off of the blanks from the heat exchanger surfaces can be prevented by having the metal texture adhere permanently to the heat exchanger surfaces. Different heat expansions between the metal texture and the zeolite crystals are compensated for by the elasticity of the metal structure.

For making the connections the following techniques are very useful, sintering, welding, galvanizing and tinning, soldering, among others. With the assistance of these connecting techniques one does not only achieve a permanent and good heat conductive coupling of the metal structure to the heat exchanger surfaces, but also to the inner interlacing metal structure at the crossing points of the texture.

A flowable zeolite mixture consisting of zeolite powder, water and, if need be, binders are fed to the metal texture or the metal texture is immersed therein for making the blanks. Encapsulated hollow spaces can be filled by high frequency shaking on the metal texture. During a careful drying at temperatures of below 100° C. the superfluous water is evaporated from the zeolite mixture. The remaining zeolite crystals connect with the metal texture and the admixed binders into solid, stable blanks.

The outer areas of the metal structure which are not to be filled with zeolite mixture are advantageously filled with water which is subsequently frozen.

The ice melts during the drying process and the water evaporates. Thus flow conduits are generated for the adsorbed substances. Since the conduits are filled with metal texture, no zeolite particles can break off and block the conduits. Flow conduits within the blanks may be kept free from zeolite in that the metal texture is removed or displaced from the flow conduits in a first operating step and that the flow conduits are filled with adaptable ice pieces which are frozen into the metal textures in a further processing step. The metal structure which had been prepared in this manner can be subsequently filled with the zeolite mixture. After the melting of the ice pieces, the flow conduits are free for the flow of the adsorptive substance.

Flow conduits are generated in a further process in that the metal structure is deformed after filling with flowable zeolite mixture. For this purpose, pressing or roller tools are advantageously suitable which press the flow conduits into the still soft blank. Compressions are generated in the metal structure with this process in the transition zones from the blank to the flow conduits. The wall of the flow conduits become so strong that an additional subsequent lining of the flow conduits with a metal texture may be partially eliminated. The pressing tool remains in the blank until the blank is partially solidified, so that the conduits cannot fill with the zeolite mixture any longer. The solidification process can be accelerated by heating the pressing tool. The water in the zeolite mixture evaporates when contacted by the hot pressing tool. A thin layer of solidified zeolite is generated. A penetration of still flowable zeolite mixture is prevented after removal of the pressing tool.

BRIEF DESCRIPTION OF THE DRAWING

One exemplified embodiment of the invention is illustrated in the drawing and is described in the following in more detail. In the drawings.

DETAILED DESCRIPTION OF THE DRAWING

Figure 1:
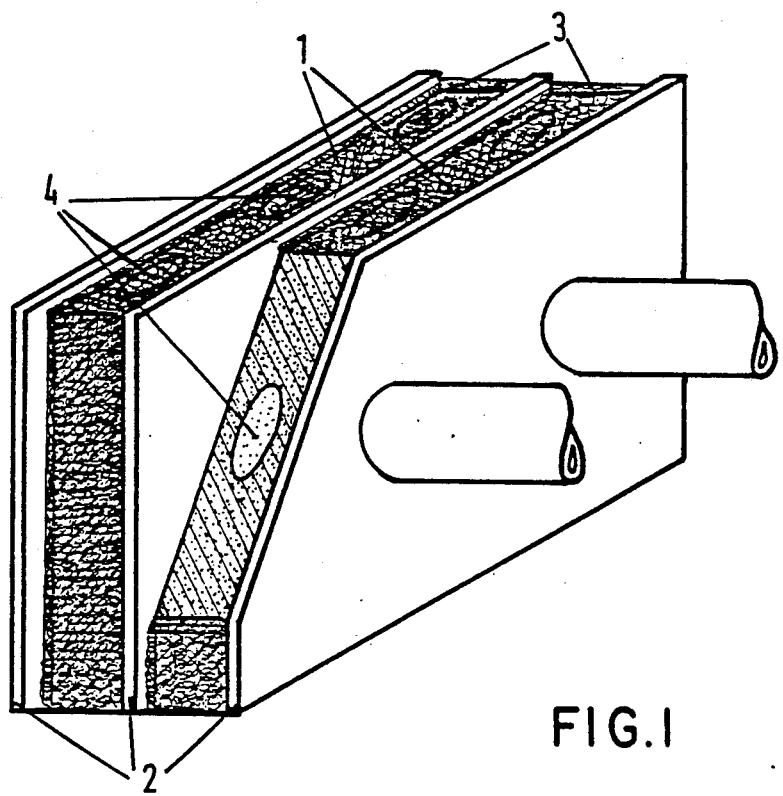
FIG. 1 shows a heat exchanger with blanks made of zeolite (1) between the heat exchanger plates (2)

A section of a laminated heat exchanger is illustrated in FIG. 1. The blanks of zeolite 1 are mounted between the heat exchanger plates 2. The metal textures 3 are connected in a good heat conducting manner with the heat exchanger plates 2 by means of a resistance welding process. The blanks 1 have areas which are not filled with zeolite. These flow conduits 4 permit the adsorbed substances a rapid access to the zeolite crystals.

Figure 2:
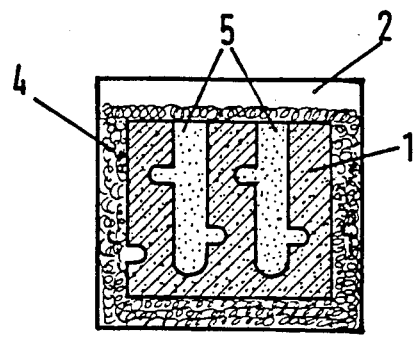
FIG. 2 shows a blank made of zeolite (1) on a heat exchanger plate (2) with impressed flow conduits.

An exemplified embodiment of a blank made from zeolite 1 is illustrated in FIG. 2 being mounted on a heat exchanger plate 2. The outer areas of the metal structure 4 are kept free from zeolite by a lining with ice. The flow conduits 5 on the upper side of the blank were produced by the pressing tools. The conduits are lined with a metal texture.

Thus, the several aforementioned objects and advantages are most effectively attained. Although several somewhat preferred embodiments have been disclosed and described in detail herein, it should be understood that this invention is in no sense limited thereby and its scope is to be determined by that of the appended claims.

We claim:

1. Blanks made of zeolite which adsorb and desorb an adsorbed substance, comprising; providing the zeolite blanks with a fine meshed metal texture, and the metal texture adhering on the surface of at least one heat exchanger by means of a very durable heat conducting connection.

2. Blanks made of zeolite which adsorb and desorb an adsorb substance, comprising; providing the zeolite blanks with a fine meshed metal texture consisting of steel wool, the metal texture adhering on the surface of at least one heat exchanger by means of a very durable heat conducting connection.

3. Blanks made of zeolite which adsorb and desorb an adsorb substance, comprising; providing the zeolite blanks with a fine meshed metal texture of metal fibers, and the metal texture adhering on the surface of at least one exchanger by means of a very durable heat conducting connection.

4. Blanks made of zeolite which adsorb and desorb an adsorb substance, comprising; providing the zeolite blanks with a fine meshed metal texture consisting of metal fleeces, and the metal texture adhering on the surface of at least one heat exchanger by means of a very durable heat conducting connection.

5. The invention in accordance with claim 1 wherein at least one of the inner area and outer zones of said metal texture is not filled with zeolite.

6. The invention in accordance with claim 1 wherein in making the zeolite blanks said metal texture undergoes a good heat conducting permanent connection with the surfaces of at least one of the heat exchangers and on the crossing points of the metal structure, respectively, by means of sintering before being filled with zeolite.

7. The invention in accordance with claim 1 wherein in making the zeolite blanks said metal texture undergoes a good heat conducting permanent connection with the surfaces of at least one of the heat exchangers and on the crossing points of the metal structure, respectively, by means of welding before being filled with zeolite.

8. The invention in accordance with claim 1 wherein in making the zeolite blanks said metal texture undergoes a good heat conducting permanent connection with the surfaces of at least one of the heat exchangers and on the crossing points of the metal structure, respectively, by means of galvanizing before being filled with zeolite.

9. The invention in accordance with claim 1 wherein in making the zeolite blanks said metal texture undergoes a good heat conducting permanent connection with the surfaces of at least one of the heat exchangers and on the crossing points of the metal structure, respectively, by means of tinning before being filled with zeolite.

10. The invention in accordance with claim 1 wherein in making the zeolite blanks said metal texture undergoes a good heat conducting permanent connection with the surfaces of at least one of the heat exchangers and on the crossing points of the metal structure, respectively, by means of soldering before being filled with zeolite.

11. Blanks made of zeolite which adsorb and desorb an adsorbed substance, comprising; providing the zeolite blanks with a fine mesh metal texture and a binder component being provided in a predetermined amount and arranged so that there is a lesser amount of binder in the inner zones of the zeolite blank for high heat conditions and a greater amount in the outer zones which are more exposed to erosion and greater stress.

* * * * *